United States Patent Office 3,318,322
Patented May 9, 1967

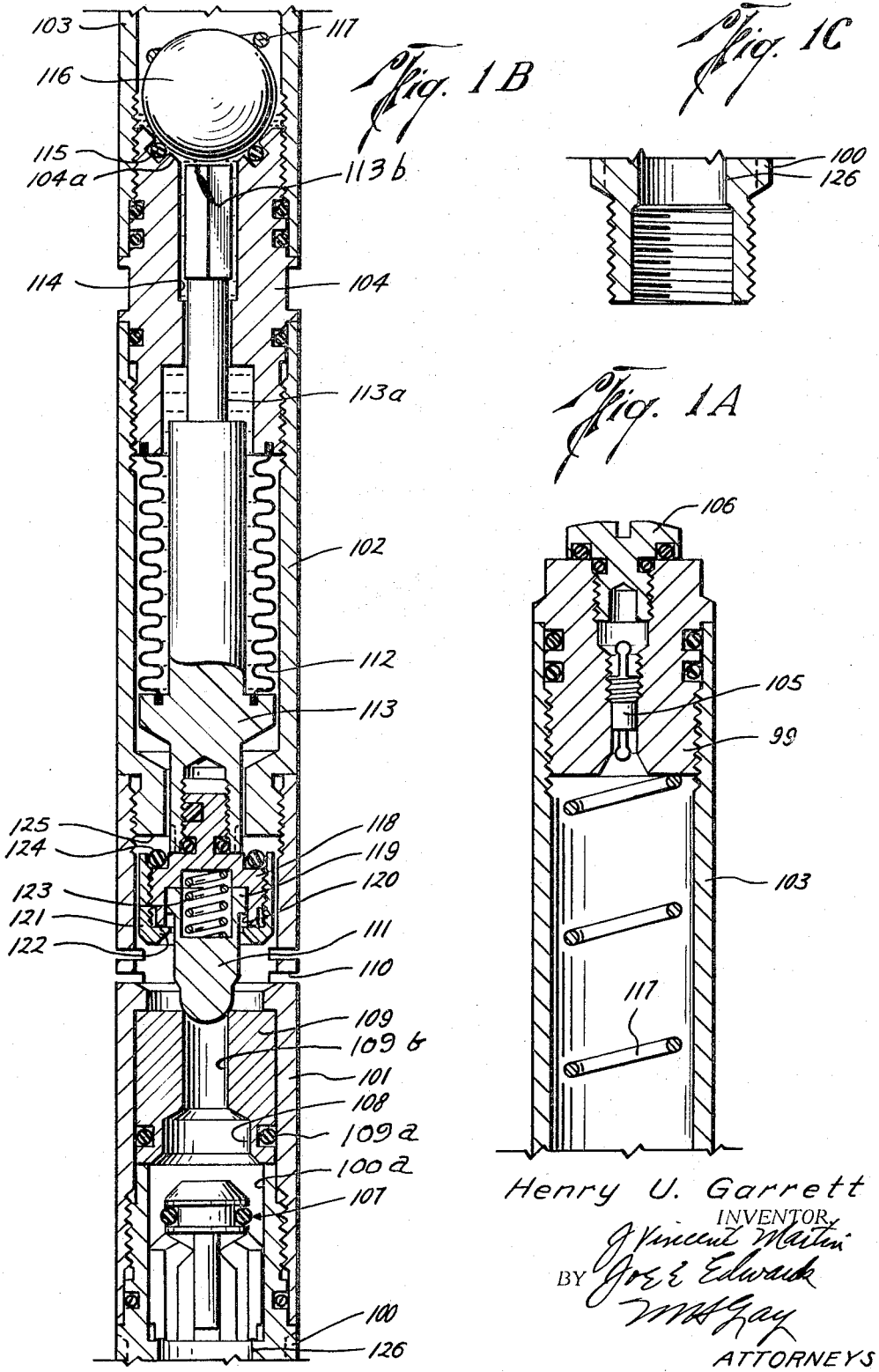

3,318,322
PRESSURE RESPONSIVE GAS LIFT VALVE
Henry U. Garrett, Longview, Tex.
(9820 Main St., Houston, Tex. 77035)
Filed Dec. 21, 1964, Ser. No. 419,870
10 Claims. (Cl. 137—155)

This invention relates to valves, and more particularly to gas lift valves for use in lifting oil from a well.

An object of this invention is to provide a gas lift valve which is extremely sensitive and which will operate at substantially the same pressure at all times.

Another object of this invention is to provide an extremely sensitive valve which will open properly when used in multi-point injection systems in gas lift valves.

Another object is to provide a gas lift valve in which the fluid motor is protected against both dome pressure and exterior pressure.

Another object is to provide a gas lift valve in which the fluid motor is protected against dome pressure in that the dome pressure may exert only a limited pressure differential across the bellows as compared to external pressure.

Another object is to provide a gas lift valve which may use an extremely sensitive motor such as a single-ply bellows in which the spring rate of the bellows will remain substantially constant even though the external pressure to which the valve is exposed and the dome pressure of the valve are sufficient to change the spring rate of the bellows if either were to be applied to the bellows alone.

Other objects, features and advantages of the invention will be apparent from the drawings, the specification and the claims.

In the drawings, wherein there is shown an illustrative embodiment of this invention, FIGURES 1A, 1B and 1C are continuation views reading from top to bottom of a valve constructed in accordance with this invention with the valve shown partly in cross-section and partly in elevation.

The valve housing is made of a number of parts to facilitate assembly. At the bottom of the valve (FIGS. 1B–1C) an adapter 100 is provided which includes a threaded end adapted to be threaded onto the conventional mandrel. Above the adapter the housing includes a main housing part 101 which has connected to its upper end a bellows housing 102. A dome housing part 103 is connected to the upper end of the bellows housing by a suitable adapter 104. The dome housing part 103 has its upper end closed by end plug 99 (FIG. 1A) A suitable inflation valve 105 is provided in plug 99 and a cap 106 is provided to seal the inflation valve passageway. A plurality of O-rings are utilized to seal between the connections between the several housing parts where it is desired that fluid be prevented from flowing through the connections. These O-rings are conventional in nature and used in the conventional way and will not be described in detail.

A check valve indicated generally at 107 prevents back flow through the valve by engaging seat 108 in seat insert 109. The seat insert is held in the main housing part 101 by the adapter 100 and flow between the insert and housing is prevented by O-ring 109a.

The housing has a main flowway therethrough which begins with the inlet ports or slots 110, continues through the bore 109b of the seat insert and thence through the bore 100a in adapter 100 to the outlet provided by the lower end of the adapter 100.

The seat insert 109 provides at its upper end a valve seat which cooperates with main valve member 111 to control flow through the flowway.

Movement of the main valve 111 toward and away from its seat is controlled by a flexible expansible chamber-type fluid motor such as bellows 112. The bellows 112 is sealed to the valve stem 113 and to the lower end of adapter 104.

The bellows 112 and the pressure dome provided by dome housing 103, adapter 104 and end plug 99 are connected by a passageway 114. This passageway 114 includes a valve seat provided at 104a at the upper end of the passageway. A suitable O-ring 115 may be provided in the seat. A one-way valve provided by ball 116 cooperates with the valve seat 104a to control flow through passageway 114. A compression spring 117 urges the ball 116 toward seat 104.

The upper end 113a of valve stem 113 is dimensioned to be below the one-way valve 116 with the parts in the position shown in FIGURE 1B. However, as the bellows 112 contracts a selected amount, the extreme upper end 113b of the valve stem contacts the ball 116 and upon further contraction of the bellows 112 the ball 116 will be unseated to establish communication between the fluid motor and dome. Of course, as the bellows is extended the valve stem moves downwardly, and when a selected point is reached the ball 116 will be permitted to return to its seat. As will appear below, the bellows 112 may extend after the main valve and one-way valve have both reached their seat to permit the internal volume of the bellows to be increased and thus relieve pressure.

The relief of pressure referred to above is permitted by means which connects the fluid motor or bellows to the main valve in a way which permits further extension of the bellows beyond its position upon seating of both the main valve and the ball valve. Preferably this means is provided by a lost motion connection between the valve stem 113 and the valve member 111. In the preferred form an outer telescoping member 18 is threadedly secured to the lower end of the stem 113. The upper end of valve member 111 has enlarged flange portion 119 which is slidably received within the bore 120 of the telescoping member 118. A suitable sleeve 121 having an inturned flange 122 is carried by the outer telescoping member. The flange member 122 limits downward movement of the main valve relative to the valve stem. It will be noted that the length of the bore 120 is greater than the comparable dimension of the flange 119 so that a telescoping motion is permitted between the main valve and the valve stem. Resilient means such as compression spring 123 may be used to urge the valve member away from the valve stem. The valve is installed in the position illustrated and gravity will normally maintain the main valve extended when off its seat. The spring 123 insures that this action will occur.

The amount of telescoping motion referred to above, and the amount of extension of the fluid motor or bellows 112 beyond the selected position at which the one-way valve seats, and as expressed in the claims, is a substantial telescoping action so that the length of the valve stem 113 is not critical. The above expressed relationship is preferred to prevent the need for critical adjustments in the length of stem 113a. If the amount of telescoping action were small, then critical adjustment would be required. As the design illustrated is one which permits substantial telescoping action, advantage is taken of this feature to avoid the need for critical adjustment.

A suitable auxiliary seal is provided for protecting the bellows from relatively high external or casing pressure. This seal may be provided by O-ring 124 which cooperates with surface 125 on the lower end of bellows housing 102 to prevent flow of fluid from the inlet into the space between the bellows 112 and the bellows housing 102 when the bellows is contracted to a selected position at which the O-ring engages surface 125.

From the above description it will be apparent that the full dome pressure is always available to return the valve member to its seat even though the bellows is always protected against a differential in both directions. In this regard it will be noted that the bellows and passageway 114 are filled with liquid. While the liquid will be slightly compressible, it may be considered to be an incompressible fluid for practical purposes.

In assembling the valve, all parts will be completely assembled before the pressure dome is charged. The bellows and passageway 114 will be filled with liquid before the ball 116 is inserted or the ball will be held off its seat while the bellows is filled. Thereafter, the dome is charged and the ball will protect the bellows from the dome during charging. Upon increasing the inlet pressure, the bellows accompanied by valve stem 113 will begin to contract. As pressure builds up, the bellows will contract to a point at which the stem 113a will contact ball 116 and unseat the ball. Preferably, the effective area of one-way valve 116 will be approximately the same as the effective area of bellows 112 and one-way valve 116 will not be unseated until the inlet pressure is approximately the same as dome pressure, taking into consideration the spring rate of bellows 112. Thus at all times the pressure differential across the bellows will be nominal due to the liquid within the bellows. After the bellows has contracted to a point where one-way valve 116 is unseated, the inturned flange 122 will engage the flange 119 on the main valve member and lift it from its seat to permit flow through the valve. If excess inlet pressure is present relative to the dome pressure, it will not be permitted to be effective on the bellows as further upward movement of the valve stem 113 will result in engagement of the O-ring 124 with surface 125 to isolate the bellows from the inlet pressure.

After casing or inlet pressure reduces during the lifting cycle, the bellows 112 will extend and return the main valve 111 to its seat. After the main valve has seated, further downward movement of the bellows will seat one-way valve 116. Of course, the two valves could seat substantially simultaneously, but it is preferred that the one-way valve seat after the main valve has seated to insure that full dome pressure will be effective on the bellows 112 until the main valve is seated. If the one-way valve is permitted to seat first, then further movement of the bellows is controlled by the pressure fluid within the bellows and the casing pressure. As pressure within the bellows will reduce with further expansion of the bellows, it is more difficult to establish the exact pressure setting at closing, and therefore it is preferred to permit the main valve to seat while full dome pressure is effective on the bellows. As mentioned above, the main valve will be in its down position before seating under the influence of gravity, and the spring 123 insures that it be in this position. Once the main valves have seated, the valve stem is free to move downwardly due to the telescoping connection between part 118 and the main valve. Once the one-way valve 116 is seated, further expansion of the bellows 112 with downward movement of the stem will result in an increase in volume within the bellows to reduce the pressure therein. Thus, as casing pressure reduces the pressure within, the bellows is permitted to reduce to prevent imposition of a large differential across the bellows. Even when the valve is returned to the surface, the substantial telescoping action permits the bellows to expand sufficiently to prevent a large differential thereacross.

With the protection afforded as explained above, a single-ply bellows may be utilized instead of the triple-ply bellows conventionally employed in gas lift valves. This single-ply bellows is much more sensitive than the triple-ply bellows, and the pressure at which the valve opens and closes will be more closely controlled and permits a much more accurate seating of the valve.

As the invention protects against distortion of the bellows, a substantial increase in life of the bellows will result. In some forms of bellows the life may be more than doubled.

The more accurate seating of the valve is particularly desirable when several valves are installed and opened during the lifting cycle, a process known as "multiple injection."

The foregoing disclosure and description of the invention are illustrative and explanatory thereof, and various changes in the size, shape and materials, as well as in the details of the illustrated construction, may be made within the scope of the appended claims without departing from the spirit of the invention.

What I claim is:

1. A pressure responsive valve comprising,
a housing having an inlet and outlet connected by a flowway,
a main valve and seat controlling the flowway,
a pressure dome in the housing,
a flexible expansible chamber-type fluid motor sensitive to a differential in dome pressure and inlet fluid pressure for actuating the main valve,
said motor defining a sealed chamber,
an incompressible liquid filling said chamber,
means isolating the fluid motor from the dome upon extension of the fluid motor to a selected position and establishing communication between the fluid motor and dome when the fluid motor is contracted beyond said selected position,
and means connecting the fluid motor to the main valve and providing for further extension of the fluid motor beyond said selected position after seating of the main valve.

2. A pressure responsive valve comprising,
a housing having an inlet and outlet connected by a flowway,
a main valve and seat controlling the flowway,
a pressure dome in the housing,
a flexible expansible chamber-type fluid motor sensitive to a differential in dome pressure and inlet fluid pressure for actuating the main valve,
said motor defining a sealed chamber,
an incompressible liquid filling said chamber,
means isolating the fluid motor from the dome upon extension of the fluid motor to a selected position and establishing communication between the fluid motor and dome when the fluid motor is contracted beyond said selected position,
means connecting the fluid motor to the main valve and providing for further extension of the fluid motor beyond said selected position after seating of the main valve,
and means isolating said fluid motor from said inlet when said fluid motor is contracted to a selected position and exposing said fluid motor to said inlet when said fluid motor is extended beyond said last mentioned position.

3. A pressure responsive valve comprising,
a housing having an inlet and outlet connected by a flowway,
a main valve and seat controlling the flowway,
a pressure dome in the housing,
a bellows connected to the dome,
an incompressible liquid filling said bellows,
means isolating the bellows from the dome on extension of the bellows to a selected position and establishing communication between the bellows and dome when the bellows is contracted beyond said selected position,
and means connecting the bellows to the main valve and providing for further extension of the bellows beyond said selected position after seating of the main valve.

4. A pressure responsive valve comprising,
a housing having an inlet and outlet connected by a flowway, a main valve and seat controlling the flowway,
a pressure dome in the housing,
a bellows connected to the dome,
an incompressible liquid filling said bellows,
means isolating the bellows from the dome on extension of the bellows to a selected position and establishing communication between the bellows and dome when the bellows is contracted beyond said selected position,
means connecting the bellows to the main valve and providing for further extension of the bellows beyond said selected position after seating of the main valve,
and means isolating said bellows from said inlet when said bellows is contracted to a selected position and exposing said bellows to said inlet when said bellows is extended beyond said last mentioned position.

5. A pressure responsive valve comprising,
a housing having an inlet and outlet connected by a flowway,
a main valve and seat controlling the flowway,
a pressure dome in the housing,
a flexible expansible chamber-type fluid motor sensitive to a differential in dome pressure and inlet fluid pressure for actuating the main valve,
said motor defining a sealed chamber,
a passageway in the housing between the pressure dome and the sealed chamber,
a one-way valve and its seat controlling flow through the passageway,
said one-way valve seatable by dome pressure,
an incompressible fluid filling said motor and passageway on the motor side of said one-way valve seat,
means maintaining said one-way valve off its seat while said motor is contracted beyond a selected position,
and means connecting said main valve to said motor and providing for movement of said motor toward said main valve upon seating of both of said valves to relieve pressure internally of said motor.

6. The valve of claim 5 wherein means are provided for isolating said fluid motor from inlet fluid pressure when said motor is contracted to a selected position and exposing said fluid motor to said inlet when said fluid motor is extended beyond said last mentioned position.

7. A pressure responsive valve comprising,
a housing having an inlet and outlet connected by a flowway,
a main valve and seat controlling the flowway,
a pressure dome in the housing,
a bellows,
a passageway in the housing between the pressure dome and bellows,
a one-way valve and seat controlling flow through the passageway and seatable by dome pressure,
an incompressible fluid filling said bellows and passageway on the bellows side of said one-way valve seat,
means maintaining said one-way valve off its seat while said main valve is unseated,
a valve stem carried by the bellows,
a lost motion connection between the valve stem and said main valve,
and resilient means urging said main valve away from said valve stem.

8. The valve of claim 7 wherein means are provided for isolating said bellows from inlet fluid pressure when said bellows is contracted to a selected position and exposing said bellows to said inlet when said bellows is extended beyond said last mentioned position.

9. A pressure responsive valve comprising,
a housing having an inlet and outlet connected by a flowway,
a main valve and seat controlling the flowway,
a pressure dome in the housing,
a bellows,
a passageway in the housing between the pressure dome and bellows,
a one-way valve and seat controlling flow through the passageway and seatable by dome pressure,
an incompressible fluid filling said bellows and passageway on the bellows side of said one-way valve seat,
a valve stem carried by said bellows,
one end of said valve stem maintaining said one-way valve off its seat while said main valve is unseated,
a lost motion connection between the other end of said valve stem and said main valve,
and resilient means urging said main valve away from said valve stem.

10. The valve of claim 9 wherein means are provided for isolating said bellows from inlet fluid pressure when said bellows is contracted to a selected position and exposing said bellows to said inlet fluid pressure when said bellows is extended beyond said last mentioned position.

References Cited by the Examiner
UNITED STATES PATENTS
2,761,465  9/1956  Garrett _____ 137—155

ALAN COHAN, *Primary Examiner.*